US012600820B2

(12) United States Patent
Wan et al.

(10) Patent No.: US 12,600,820 B2
(45) Date of Patent: Apr. 14, 2026

(54) PHOTOCURABLE COMPOSITION WITH HIGH SILICON CONTENT

(71) Applicant: CANON KABUSHIKI KAISHA, Tokyo (JP)

(72) Inventors: Fen Wan, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 719 days.

(21) Appl. No.: 18/062,374

(22) Filed: Dec. 6, 2022

(65) Prior Publication Data

US 2024/0199816 A1 Jun. 20, 2024

(51) Int. Cl.
*C08G 77/22* (2006.01)
*C08G 77/18* (2006.01)
*C09D 183/08* (2006.01)

(52) U.S. Cl.
CPC ............. *C08G 77/22* (2013.01); *C08G 77/18* (2013.01); *C09D 183/08* (2013.01)

(58) Field of Classification Search
USPC ........................................... 522/99, 148, 172
See application file for complete search history.

(56) References Cited

U.S. PATENT DOCUMENTS

| | | | | |
|---|---|---|---|---|
| 4,808,682 | A * | 2/1989 | Schwalm | G03F 7/095 430/311 |
| 7,122,079 | B2 | 10/2006 | Xu | |
| 7,122,482 | B2 * | 10/2006 | Xu | B82Y 40/00 264/293 |
| 7,282,550 | B2 * | 10/2007 | Xu | C08F 230/08 438/738 |
| 8,827,447 | B2 * | 9/2014 | Awasthi | C08G 77/50 351/159.01 |
| 8,889,332 | B2 | 11/2014 | Xu | |
| 9,050,624 | B2 | 6/2015 | Takeuchi | |
| 9,228,035 | B2 | 1/2016 | Umekawa | |
| 9,482,950 | B2 | 11/2016 | Kodama | |
| 9,533,467 | B2 | 1/2017 | Kobayashi | |
| 9,746,766 | B2 | 8/2017 | Konno | |
| 10,197,916 | B2 | 2/2019 | Ibe | |
| 2005/0100830 | A1 | 5/2005 | Xu | |
| 2011/0046332 | A1 | 2/2011 | Breiner | |
| 2011/0140306 | A1 | 6/2011 | Xu | |
| 2014/0100291 | A1 | 4/2014 | Chang et al. | |
| 2015/0252125 | A1 | 9/2015 | Moro et al. | |
| 2019/0293960 | A1 | 9/2019 | Patton et al. | |

FOREIGN PATENT DOCUMENTS

TW 201006853 A 2/2010

OTHER PUBLICATIONS

International Search Report with regard to International Application PCT/US/2023/80472, dated Apr. 12, 2024, pp. 1-11.

* cited by examiner

*Primary Examiner* — Sanza L. McClendon
(74) *Attorney, Agent, or Firm* — Abel Schillinger, LLP

(57) ABSTRACT

A photocurable composition can comprise a polymerizable material and a photoinitiator, wherein the polymerizable material may comprise at least one silicon-containing monomer having a structure of formula (1)

(1)

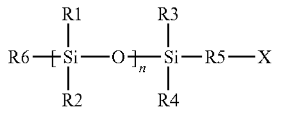

with R1, R2: —O—Si($CH_3$)$_3$, alkyl, aryl, or alkylaryl; R3, R4: —O—Si($CH_3$)$_3$, alkyl, aryl, or alkylaryl; R5: $C_1$-$C_5$-alkyl, aryl, alkylaryl; R6: —R5-X, or X, or —O—Si($CH_3$)$_3$, or alkyl, or aryl, or alkylaryl; X: acrylate or methacrylate; and n: 0-4. The amount of silicon (Si) in the photocurable composition can be at least 15 wt % based on the total weight of the photocurable composition.

20 Claims, No Drawings

PHOTOCURABLE COMPOSITION WITH HIGH SILICON CONTENT

FIELD OF THE DISCLOSURE

The present disclosure relates to a photocurable composition, particularly to a photocurable composition for inkjet adaptive planarization adapted for forming photo-cured layers having a high silicon content.

BACKGROUND

Inkjet Adaptive Planarization (IAP) is a process which planarizes a surface of a substrate, e.g., a wafer containing an electric circuit, by jetting liquid drops of a photocurable composition on the surface of the substrate, and bringing a flat superstrate in direct contact with the added liquid to form a flat liquid layer. The flat liquid layer is typically solidified under UV light exposure, and after removal of the superstrate a planar polymeric surface is obtained, which can be subjected to subsequent processing steps, for example baking, etching, and/or further deposition steps.

There exists a need for improved IAP materials leading to planar photo-cured layers with a high etch resistance.

SUMMARY

In one embodiment, a photocurable composition can comprise a photocurable composition comprising a polymerizable material and a photoinitiator, wherein the polymerizable material can include at least one silicon-containing monomer having a structure of formula (1)

(1)

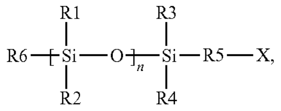

with R1, R2: —O—$Si(CH_3)_3$, alkyl, or aryl, or alkylaryl; R3, R4: —O—$Si(CH_3)_3$, or alkyl, or aryl, or alkylaryl; R5: $C_1$-$C_1$-alkyl, or aryl, or alkylaryl; R6: —R5-X, or X, or —O—$Si(CH_3)_3$, or alkyl, or aryl, or alkylaryl; X: acrylate or methacrylate; and n: 0-4; and wherein an amount of silicon (Si) in the photocurable composition may be at least 15 wt % based on the total weight of the photocurable composition.

In one aspect of the photocurable composition, the amount of Si can be at least 20 wt % based on the total weight of the photocurable composition.

In a further aspect, the molecular weight of the silicon-containing monomer can be at least 100 g/mol and not greater than 800 g/mol.

In another aspect, the amount of the at least one silicon-containing monomer can be at least 60 wt % based on the total weight of the polymerizable material. In a particular aspect, the amount of the at least one silicon-containing monomer can be at least 60 wt % and not greater than 85 wt % based on the total weight of the polymerizable material.

In a further embodiment, the viscosity of the photocurable composition can be not greater than 20 mPa·s.

In another embodiment, the amount of the polymerizable material can be at least 90 wt % based on the total weight of the photocurable composition.

In a further aspect, the photocurable composition can be essentially free of a solvent.

In one embodiment of the photocurable composition, the at least one silicon-containing monomer can include at least two different silicon-containing monomers.

In aspects, the at least one silicon-containing monomer can be selected from the group of methacryloxymethyltris(trimethylsiloxane)silane (SiM1), 1,3-bis(3-methacryloxypropyl)tetrakis(trimethylsiloxy)disiloxane (SiM2), 3-acryloxypropyltris(trimethylsiloxy)silane (SiM3), (methacryloxymethyl)bis(trimethylsiloxy)methylsilane (SiM4), 3-methacryloxypropylbis(trimethylsiloxy)methylsilane (SiM5), (3-acryloxypropyl)methylbis(trimethylsiloxy)silane (SiM6), methacryloxypropyltris(trimethylsiloxy)silane (SiM7), acryloxymethyltrimethylsilane (SiM8), acryloxymethyltris(trimethylsiloxy)silane (SiM9), 1,3-bis[(acryloxymethyl)phenethyl]tetramethyldisiloxane (SiM10), or any combination thereof.

In a particular aspect, the at least one silicon-containing monomer can include methacryloxymethyltris(trimethylsiloxane)silane (SiM1), or 1,3-bis(3-methacryloxypropyl)tetrakis(trimethylsiloxy)disiloxane (SiM2), or 3-acryloxypropyl-tris(trimethylsiloxy)silane (SiM3), or any combination thereof.

In one embodiment, the photocurable composition can comprise at least one polymerizable monomer not containing silicon. In one aspect, the polymerizable monomer not containing silicon can include an acrylate monomer. In a certain aspect, the acrylate monomer can include benzyl acrylate (BA); isobornyl acrylate (IBOA); 1,5-pentanediol diacrylate (MPDA); dihydrodicyclopentadienyl acrylate (DCPA); tricyclodecane dimethanol diacrylate (A-DCP); 2-Propenoic acid, 1-phenyl-1,2-ethanediyl ester (PHEDA); or any combination thereof.

In another embodiment, a laminate can comprise a substrate and a photo-cured layer overlying the substrate, wherein the photo-cured layer is formed from the above-described photocurable composition.

In one embodiment, a method of forming a photo-cured layer on a substrate can comprise: applying a layer of a photocurable composition on the substrate, wherein the photocurable composition comprises a polymerizable material and at least one photoinitiator, and wherein the polymerizable material comprises at least one silicon-containing monomer having a structure of formula (1)

(1)

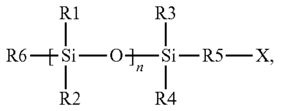

with R1, R2: —O—$Si(CH_3)_3$, or alkyl, or aryl, or alkylaryl; R3, R4: —O—$Si(CH_3)_3$, or alkyl, or aryl, or alkylaryl; R5: $C_1$-$C_1$-alkyl, or aryl, or alkylaryl; R6: —R5-X, or X, or —O—$Si(CH_3)_3$, or alkyl, or aryl, or alkylaryl; X: acrylate or methacrylate; n: 0-4; and wherein an amount of silicon (Si) in the photocurable composition is at least 15 wt % based on the total weight of the photocurable; bringing the photocurable composition into contact with a template or a superstrate; irradiating the photocurable composition with light to form a photo-cured layer; and removing the template or the superstrate from the photo-cured layer.

In one aspect of the method, the amount of Si can be at least 20 wt % based on the total weight of the photocurable composition.

In another aspect of the method, the viscosity of the photocurable composition may be not greater than 20 mPa·s.

In a further aspect of the method, the amount of the polymerizable material can be at least 90 wt % based on the total weight of the photocurable composition.

In another embodiment, a method of manufacturing an article can comprise: applying a layer of a photocurable composition on a substrate, wherein the photocurable composition comprises a polymerizable material and at least one photoinitiator, wherein the polymerizable material comprises at least one silicon-containing monomer having a structure of formula (1)

(1)

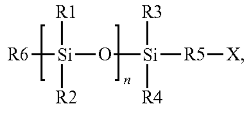

with R1, R2: —O—$Si(CH_3)_3$, alkyl, aryl, or alkylaryl, R3, R4: —O—$Si(CH_3)_3$, alkyl, aryl, or alkylaryl; R5: $C_1$-$C_5$-alkyl, aryl, alkylaryl; R6: —R5-X, or X, or —O—$Si(CH_3)_3$, or alkyl, or aryl, or alkylaryl; X: acrylate or methacrylate; n: 0-4; and an amount of silicon (Si) in the photocurable composition may be at least 15 wt % based on the total weight of the photocurable; bringing the photocurable composition into contact with a template or a superstrate; irradiating the photocurable composition with light to form a photo-cured layer; removing the template or the superstrate from the photo-cured layer; forming a pattern on the substrate; processing the substrate on which the pattern has been formed in the forming; and manufacturing an article from the substrate processed in the processing.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photoinitiator, wherein the polymerizable material comprises at least one silicon-containing monomer having a structure of formula (1)

(1)

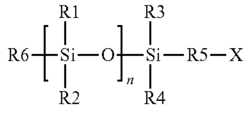

with R1, R2: —O—$Si(CH_3)_3$, alkyl, aryl, or alkylaryl; R3, R4: —O—$Si(CH_3)_3$, alkyl, aryl, or alkylaryl; R5: $C_1$-$C_5$-alkyl, or aryl, or alkylaryl; R6: —R5-X, or X, or —O—$Si(CH_3)_3$, or alkyl, or aryl, or alkylaryl; X: acrylate or methacrylate; and n: 0-4. The amount of silicon (Si) in the photocurable composition can be at least 15 wt % based on the total weight of the photocurable composition.

As used herein, if not indicated otherwise, the expression "silicon-containing monomer" refers to a monomer falling under the structure of formula (1).

In certain aspects, the amount of silicon in the photocurable composition can be at least 16 wt % based on the total weight of the photocurable composition, such as at least 17 wt %, at least 18 wt %, at least 19 wt %, or at least 20 wt %. In other aspects, the amount of silicon in the photocurable composition may be not greater than 33 wt %, or not greater than 30 wt %, or not greater than 28 wt %, or not greater than 25 wt %.

In certain aspects, the molecular weight of the silicon-containing monomer can be at least 100 g/mol, or at least 200 g/mol, or at least 300 g/mol, or at least 400 g/mol. In other aspects, the molecular weight of the silicon-containing monomer may be not greater than 800 g/mol, or not be greater than 700 g/mol, or not greater than 600 g/mol, or not greater than 500 g/mol, or not greater than 400 g/mol.

In a further aspect, the amount of the at least one silicon-containing monomer can be at least 60 wt % based on the total weight of the polymerizable material, such as at least 65 wt %, or at least 70 wt %, or at least 80 wt %, or at least 90 wt %, or at least 95 wt %, or 100 wt %. In another aspect, the amount of the silicon-containing monomer may be not greater than 99 wt % based on the total weight of the polymerizable material, or not greater than 95 wt %, or not greater than 90 wt %, or not greater than 85 wt %. In a particular aspect the amount of the silicon-containing monomer can be at least 60 wt % and not greater than 85 wt % based on the total weight of the polymerizable material.

Non-limiting example structure of polymerizable monomers falling under the structure of formula (1) of the silicon-containing monomer can be:

methacryloxymethyltris(trimethylsiloxane)silane (SiM1):

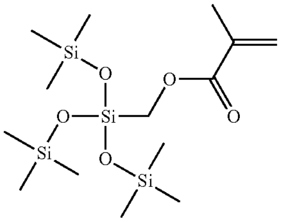 [SMILES: C=C(C)C(=O)OC[Si](O[Si](C)(C)C)(O[Si](C)(C)C)O[Si](C)(C)C]

1,3-bis(3-methacryloxypropyl)tetrakis(trimethylsiloxy)disiloxane (SiM2):

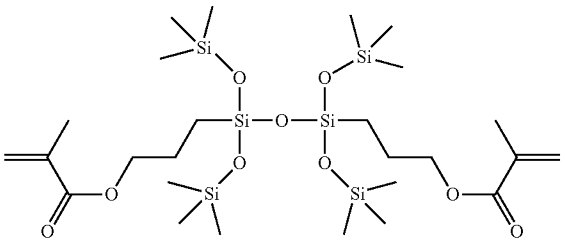 [SMILES: C=C(C)C(=O)OCCC[Si](O[Si](C)(C)C)(O[Si](C)(C)C)O[Si](CCCOC(=O)C(=C)C)(O[Si](C)(C)C)O[Si](C)(C)C]

3-acryloxypropyltris(trimethylsiloxy)silane (SiM3):

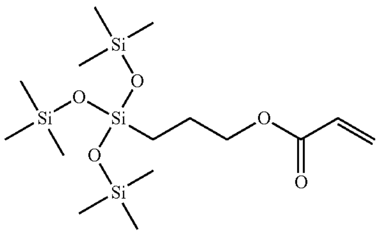 [SMILES: C=CC(=O)OCCC[Si](O[Si](C)(C)C)(O[Si](C)(C)C)O[Si](C)(C)C]

(methacryloxymethyl)bis(trimethylsiloxy)methylsilane (SiM4):

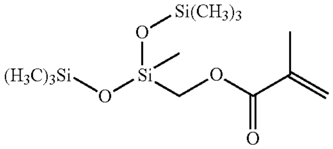

3-methacryloxypropylbis(trimethylsiloxy)methylsilane (SiM5):

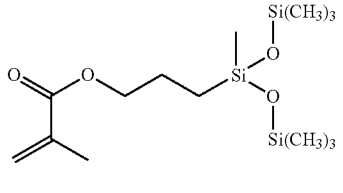

(3-acryloxypropyl)methylbis(trimethylsiloxy)silane (SiM6):

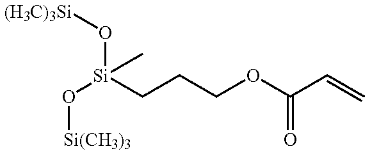

methacryloxypropyltris(trimethylsiloxy)silane (SiM7):

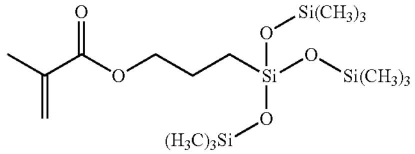

acryloxymethyltrimethylsilane (SiM8):

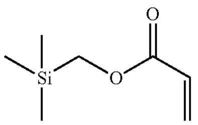

acryloxymethyltris(trimethylsiloxy)silane (SiM9):

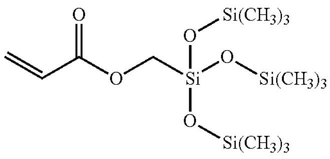

or 1,3-bis[(acryloxymethyl)phenethyl]tetramethyldisiloxane (SiM10):

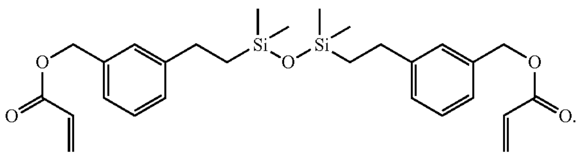 [SMILES: C=CC(=O)OCc1cccc(CC[Si](C)(C)O[Si](C)(C)CCc2cccc(COC(=O)C=C)c2)c1]

The photocurable composition of the present disclosure can be designed of having a low viscosity before curing. In one embodiment, the viscosity of the curable composition can be not greater than 30 mPa·s, or not greater than 25 mPa·s, or not greater than 20 mPa·s, or not greater than 15 mPa·s, or not greater than 10 mPa·s. In another certain embodiment, the viscosity may be at least 5 mPa·s. In a particularly preferred aspect, the photocurable composition can have a viscosity from 5 mPa·s to not greater than 20 mPa·s. As used herein, all viscosity values relate to viscosities measured at a temperature of 23° C. with the Brookfield method using a Brookfield Viscometer.

In one embodiment, the polymerizable material of photocurable composition can further include at least one polymerizable monomer not containing silicon, such as one or more mono-functional and/or one or more multi-functional polymerizable monomers.

In one aspect, the polymerizable monomer not containing silicon can include an acrylate monomer. As used herein the term acrylate monomer relates to both unsubstituted and alkyl-substituted acrylates, for example, methacrylate. Non-limiting examples of acrylate monomers can be benzylacrylate (BA), isobornyl acrylate (IBOA), 1,5-pentanediol diacrylate (MPDA), dihydrodicyclopentadienyl acrylate (DCPA), tricyclodecane dimethanol diacrylate (A-DCP), 2-Propenoic acid, 1-phenyl-1,2-ethanediyl ester (or phenyl ethanediol diacrylate) (PHEDA), bisphenol A dimethacrylate, m-xylylene diacrylate, neopentyl glycol diacrylate, or any combination thereof.

In a further aspect, the amount of the at least one monomer not including silicon can be at least 5 wt % based on the total weight of the polymerizable material, or at least 10 wt %, or at least 15 wt %, or at least 20 wt %, or at least 25 wt %. In another aspect, the amount of monomer not including silicon may be not greater than 40 wt % based on the total weight of the polymerizable material, or not greater than 35 wt %, or not greater than 30 wt %, or not greater than 25 wt %, or not greater than 20 wt %.

The amount of polymerizable material in the photocurable composition can be at least 50 wt % based on the total weight of the photocurable composition, such as at least 60 wt %, at least 70 wt %, or at least 80 wt %, or at least 90 wt %, or at least 95 wt %. In another aspect, the amount of polymerizable material may be not greater than 99 wt %, such as not greater than 97 wt %, not greater than 95 wt %, not greater than 90 wt %, not greater than 85 wt %, or not greater than 80 wt %, or not greater than 70 wt %. The amount of the polymerizable material can be a value between any of the minimum and maximum values noted above. In a particular aspect, the amount of the polymerizable material can be at least 70 wt % and not greater than 98 wt %.

In one embodiment, the photocurable composition of the present disclosure can be essentially free of a solvent. As used herein, if not indicated otherwise, the term solvent relates to a compound which can dissolve or disperse the polymerizable monomers but does not itself polymerize during the photo-curing of the photocurable composition. The term "essentially free of a solvent" means herein an amount of solvent being not greater than 5 wt % based on the total weight of the photocurable composition. In a certain particular aspect, the amount of the solvent can be not greater than 3 wt %, not greater than 2 wt %, not greater than 1 wt % based on the total weight or the photocurable composition, or the photocurable composition can be free of a solvent, except for unavoidable impurities.

In another particular aspect, the photocurable composition can include a solvent in an amount of at least 5 wt % based on the total weight of the photocurable composition, or at least 8 wt %, at least 10 wt %, at least 15 wt %, or at least 20 wt %. In another aspect the amount of solvent may be not greater than 30 wt %, or not greater than 20 wt %, or not greater than 15 wt %, or not greater than 10 wt %, or not greater than 5 wt %, or not greater than 3 wt % based on the total weight of the photocurable composition.

In order to initiate the photo-curing of the composition if exposed to light, one or more photoinitiators can be included in the photocurable composition. In a certain aspect, the curing can be also conducted by a combination of light and heat curing.

The photocurable composition can further contain one or more optional additives. Non-limiting examples of optional additives can be stabilizers, dispersants, solvents, surfactants, inhibitors or any combination thereof.

The photocurable composition of the present disclosure can be adapted for use in inkjet adaptive planarization (IAP) or in nanoimprint lithography (NIL).

In one embodiment, the photocurable composition can be applied on a substrate to form a photo-cured layer. As used herein, the combination of substrate and photo-cured layer overlying the substrate is called a laminate.

It has been surprisingly observed that the photocurable composition of the present disclosure can be adapted that a photo-cured layer formed from the photocurable composition may have a high etch resistance. High etch resistance is an important property of resist materials in the fields of nanoimprint lithography (NIL) and inkjet adaptive planarization (IAP). For example, in order to obtain a good pattern transfer in the sub-100 nm range, or even less 20 nm, a high etch resistance is desired. The photocurable composition can combine a high etch resistance with a low viscosity, fast curing rate, and a good strength of the resist after curing. Moreover, a stability of the photocurable composition (no unwanted curing reactions) can be observed for at least three months.

The present disclosure is further directed to a method of forming a photo-cured layer. The method can comprise applying a layer of the photocurable composition described above on the surface of a substrate, bringing the photocurable composition into contact with a template or superstrate; irradiating the photocurable composition with light to form a photo-cured layer; and removing the template or the superstrate from the photo-cured layer.

The substrate and the solidified layer may be subjected to additional processing, for example, an etching process, to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like.

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

EXAMPLES

The following non-limiting examples illustrate the concepts as described herein.

Example 1

Photocurable Compositions.

Photocurable compositions were prepared including the following silicon-containing monomers in varying combinations and amounts: methacryloxymethyltris(trimethyl siloxane)silane (SiM1), 1,3-bis(3-methacryl oxypropyl)tetrakis(trimethylsiloxy)disiloxane (SiM2), and 3-acryloxypropyl-tris(trimethylsiloxy)silane (SiM3). Furthermore, the following polymerizable monomers which do not contain silicon were used in the compositions: dihydrodicyclopentadienyl acrylate (DCPA), benzyl acrylate (BZA), dipentaerythritol penta/hexa acrylate (DPHA), tricyclodecane dimethanol diacrylate (A-DCP), and 1-phenyl-1,2-ethanediyl ester (PHEDA). A detailed summary of the polymerizable monomers for each composition is shown in Table 1.

The photocurable compositions further contained one or more photoinitiators and surfactants, of which the types and amounts are also summarized in Table 1.

TABLE 1

| Ingredient | S1 | S2 | S3 | C1 | C2 | C3 | C4 | C6 | C7 |
|---|---|---|---|---|---|---|---|---|---|
| SiM2 | 50 | 50 | 25 | | 50 | | | | |
| SiM1 | 50 | | 75 | 50 | | 50 | | 50 | 50 |
| SiM3 | | 50 | | | | | 50 | | |
| DCPA | | | | 25 | 25 | | | | |
| BA | | | | | 25 | 25 | 25 | 25 | 10 |
| A-DCP | | | | | | 25 | 25 | 25 | |
| PHEDA | | | | 25 | | | | | 25 |
| DPHPA | | | | | | | | | 15 |
| Irgacure TPO | | | | | 1 | 1 | 1 | | |
| Irgacure 4265 | | | | | 3 | 3 | 3 | | |
| Irgacure 907 | 2 | 2 | 2 | 2 | | | | 2 | 2 |
| FSKM2 | 3 | 3 | 3 | 3 | 2 | 2 | 2 | 3 | 3 |
| FSKM1 | 0.5 | | | 0.5 | 2 | 2 | 2 | | |
| Si [%] | 26.5 | 26.0 | 27.4 | 14.2 | 12.3 | 14.2 | 13.7 | 14.2 | 14.2 |
| Viscosity [mPa · s] | 6.9 | 11.6 | 4.5 | 6.1 | 8.6 | 6.4 | 9.5 | 4.8 | 5.9 |

Dry Etch Resistance

Photo-cured films for testing the etch resistance were made by printing a resist film on a silicon wafer using a J-FIL Imprint Tool I300, whereby the film was fully cured during UV exposure. The thickness of the resist film after curing was about 100 nm.

For measuring the etch resistance, dry etching under oxygen/argon atmosphere was conducted using a Trion Oracle 3-Chamber Cluster System as etch tool. Two different dry etch chemistries have been tested: 1) etching with an oxygen/argon gas combination ($O_2$/Ar); and 2) etching with a combination of chlorine gas and oxygen ($Cl_2/O_2$).

The following etch conditions were applied.

$O_2$/Ar—etching: $O_2$: 2 sccm; Argon: 10 sccm; RF power: 45 Watt; pressure: 10 mTorr; etch time: 72 seconds; ICP: 0 Watt.

$Cl_2/O_2$—etching: $Cl_2$: 54 sccm; $O_2$: 9 sccm; RF power: 90 Watt; pressure: 150 mTorr; etch time: 90 seconds; ICP: 0 Watt.

Table 2 shows the measured etch rates converted to nm/minute for photo-cured samples S1 (made with resist composition containing 26.5 wt % silicon), C1 (made with resist composition containing 14.2 wt % silicon), and C8 (made with resist composition not containing any silicon). Comparative composition C8 contained 36 parts of IBOA, 21 parts of DCPA, 24 parts of BZA and 20 parts of SR247 (crosslinker), together with 3 parts of photoinitiators (1 part of Irgacure 907+2 parts of Irgacure 651 from BASF, USA), 4 parts of surfactant (2.7 parts of FS2000M1 and 1.4 parts of FS2000M2), which was added as a release agent. Composition C8 had a viscosity of 7.0 mPa s at 23° C.

It can be seen that sample S1 had the best etch resistance for both etching chemistries, $O_2$/Ar and $Cl_2/O_2$ etching. A lower content of Si, as in sample C1, led to a lower etch resistance compared to sample S1. The lowest etch resistance (corresponding to the highest etch rate) was observed for sample C8, which did not contain any silicon.

TABLE 2

| | Etch rate [nm/min] | |
|---|---|---|
| Sample | $O_2$/Ar | $Cl_2/O_2$ |
| S1 | 7.8 | 9.9 |
| C1 | 12.4 | 15.0 |
| C8 | 52.6 / 58.4 | 19.9 / 19.5 |

Viscosities

The viscosities measured for all samples shown in Table 1 show that even the representative samples S1, S2, and S3 have very low viscosities, even below 10 mPa·s.

The viscosities were measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

Silicon Content Calculation

The silicon content of the polymerizable material of the photocurable compositions was calculated according to the following equation: $Si[wt\,\%]=[\Sigma w_i(n_i M_{si})/M_i)]\times 100\%$, with $M_{Si}$ being the molecular weight of silicon, $M_i$ being the molecular weight of the respective complete monomer, $n_i$ the mol amount of Si in the respective monomer, $w_i$ the mol amount of the respective monomer in the complete composition, e.g. $w_i$=0.5 means that the respective monomer contributes to 50 wt % in the composition.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photoinitiator, wherein the polymerizable material comprises at least one silicon-containing monomer having a structure of formula (1)

(1)

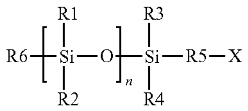

with R1, R2: —O—Si($CH_3$)$_3$, alkyl, aryl, or alkylaryl

R3, R4: —O—Si($CH_3$)$_3$, alkyl, aryl, or alkylaryl

R5: $C_1$-$C_5$-alkyl, aryl, alkylaryl

R6: —R5-X, or X, or —O—Si($CH_3$)$_3$, or alkyl, or aryl, or alkylaryl

X: acrylate or methacrylate n: 0-4;

an amount of silicon (Si) in the photocurable composition is at least 15 wt % based on the total weight of the photocurable composition; and a viscosity of the photocurable composition is not greater than 20 mPa·s.

2. The photocurable composition of claim 1, wherein the amount of Si is at least 20 wt % based on the total weight of the photocurable composition.

3. The photocurable composition of claim 1, wherein a molecular weight of the silicon-containing monomer is at least 100 g/mol and not greater than 700 g/mol.

4. The photocurable composition of claim 1, wherein an amount of the at least one silicon-containing monomer of formula (1) is at least 60 wt % based on the total weight of the polymerizable material.

5. The photocurable composition of claim 4, wherein the amount of the at least one silicon-containing monomer is at least 60 wt % and not greater than 85 wt % based on the total weight of the polymerizable material.

6. The photocurable composition of claim 1, wherein an amount of the polymerizable material is at least 90 wt % based on the total weight of the photocurable composition.

7. The photocurable composition of claim 1, wherein the photocurable composition is essentially free of a solvent.

8. The photocurable composition of claim 1, wherein the at least one silicon-containing monomer includes at least two different silicon-containing monomers.

9. The photocurable composition of claim 1, wherein the at least one silicon-containing monomer is selected from the group of methacryloxymethyltris(trimethylsiloxane)silane (SiM1), 1,3-bis(3-methacryloxypropyl)tetrakis(trimethylsiloxy) disiloxane (SiM2), 3-acryloxypropyltris(trimethylsiloxy)silane (SiM3), (methacryloxymethyl)bis(trimethylsiloxy)methylsilane (SiM4), 3-methacryloxypropylbis(trimethylsiloxy)methylsilane (SiM5), (3-acryloxypropyl)methylbis(trimethylsiloxy)silane (SiM6), methacryloxypropyltris(trimethylsiloxy)silane (SiM7), acryloxymethyltrimethylsilane (SiM8), acryloxymethyltris(trimethylsiloxy)silane (SiM9), 1,3-bis[(acryloxymethyl)phenethyl]tetramethyldisiloxane (SiM10), or any combination thereof.

10. The photocurable composition of claim 9, wherein the at least one silicon-containing monomer includes methacryloxymethyltris(trimethylsiloxane)silane (SiM1), 1,3-bis(3-methacryloxypropyl)tetrakis(trimethylsiloxy) disiloxane (SiM2), or 3-acryloxypropyl-tris(trimethylsiloxy)silane (SiM3), or any combination thereof.

11. The photocurable composition of claim 1, wherein the polymerizable material further comprises at least one polymerizable monomer not containing silicon.

12. The photocurable composition of claim 11, wherein the polymerizable monomer not containing silicon includes an acrylate monomer.

13. The photocurable composition of claim 12, wherein the acrylate monomer includes benzyl acrylate (BA), isobornyl acrylate (IBOA), 1,5-pentanediol diacrylate (MPDA), dihydrodicyclopentadienyl acrylate (DCPA), tricyclodecane dimethanol diacrylate (A-DCP), 1-phenyl-1,2-ethanediyl ester (PHEDA), or any combination thereof.

14. A laminate, the laminate comprising a substrate and a photo-cured layer overlying the substrate, wherein the photo-cured layer is formed from the photocurable composition of claim 1.

15. A method of forming a photo-cured layer on a substrate, comprising:

applying a layer of a photocurable composition on the substrate, wherein the photocurable composition comprises a polymerizable material and at least one photoinitiator, wherein the polymerizable material comprises at least one silicon-containing monomer having a structure of formula (1)

(1)

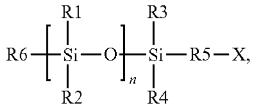

with R1, R2: —O—Si($CH_3$)$_3$, alkyl, aryl, or alkylaryl

R3, R4: —O—Si($CH_3$)$_3$, alkyl, aryl, or alkylaryl

R5: $C_1$-$C_5$-alkyl, aryl, alkylaryl

R6: —R5-X, or X, or —O—Si($CH_3$)$_3$, or alkyl, or aryl, or alkylaryl

X: acrylate or methacrylate n: 0-4; and an amount of silicon (Si) in the photocurable composition is at least 15 wt % based on the total weight of the photocurable;

bringing the photocurable composition into contact with a template or a superstrate;

irradiating the photocurable composition with light to form a photo-cured layer; and removing the template or the superstrate from the photo-cured layer.

16. The method of claim 15, wherein the amount of Si is at least 20 wt % based on the total weight of the photocurable composition.

17. The method of claim 15, wherein a viscosity of the photocurable composition is not greater than 20 mPa·s.

18. The method of claim 15, wherein an amount of the polymerizable material is at least 90 wt % based on the total weight of the photocurable composition.

19. A method of manufacturing an article, comprising:

applying a layer of a photocurable composition on a substrate, wherein the photocurable composition comprises a polymerizable material and at least one photoinitiator, wherein the polymerizable material comprises at least one silicon-containing monomer having a structure of formula (1)

(1)

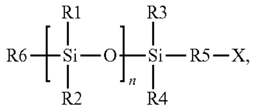

with R1, R2: —O—$Si(CH_3)_3$, alkyl, aryl, or alkylaryl

R3, R4: —O—$Si(CH_3)_3$, alkyl, aryl, or alkylaryl

R5: $C_1$-$C_5$-alkyl, aryl, alkylaryl

R6: —R5-X, or X, or —O—$Si(CH_3)_3$, or alkyl, or aryl, or alkylaryl

X: acrylate or methacrylate n: 0-4; and an amount of silicon (Si) in the photocurable composition is at least 15 wt % based on the total weight of the photocurable composition;

bringing the photocurable composition into contact with a template or a superstrate;

irradiating the photocurable composition with light to form a photo-cured layer;

removing the template or the superstrate from the photo-cured layer;

forming a pattern on the substrate;

processing the substrate on which the pattern has been formed in the forming; and manufacturing the article from the substrate processed in the processing.

20. A photocurable composition comprising a polymerizable material and a photoinitiator, wherein the polymerizable material comprises at least one silicon-containing monomer having a structure of formula (1)

(1)

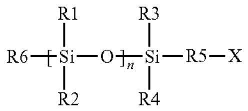

with R1, R2: —O—$Si(CH_3)_3$, alkyl, aryl, or alkylaryl

R3, R4: —O—$Si(CH_3)_3$, alkyl, aryl, or alkylaryl

R5: $C_1$-$C_5$-alkyl, aryl, alkylaryl

R6: —R5-X, or X, or —O—$Si(CH_3)_3$, or alkyl, or aryl, or alkylaryl

X: acrylate or methacrylate n: 0-4;

an amount of silicon (Si) in the photocurable composition is at least 15 wt % based on the total weight of the photocurable composition; and the at least one silicon-containing monomer includes methacryloxymethyltris(trimethylsiloxane)silane (SiM1), 1,3-bis(3-methacryloxypropyl)tetrakis(trimethylsiloxy)disiloxane (SiM2), 3-acryloxypropyl-tris(trimethylsiloxy)silane (SiM3), or any combination thereof.

* * * * *